United States Patent Office 2,819,294
Patented Jan. 7, 1958

2,819,294

ALPHA-CARBO(PHENOXYALKOXY)ETHYL N-PHENYLCARBAMATES

Alphonse Pechukas, Bronxville, N. Y., assignor to Columbia-Southern Chemical Corporation, Allegheny County, Pa., a corporation of Delaware No Drawing. Application April 19, 1955
Serial No. 502,521

7 Claims. (Cl. 260—471)

This invention relates to alpha-carbo-(phenoxyalkoxy)-ethyl N-phenylcarbamates and their use as agricultural chemicals, notably as weed combatants or herbicides.

According to the present invention, novel compounds, the alpha-carbo(phenoxyalkoxy)ethyl N-phenylcarbamates, have been provided. These alpha-carbo(phenoxyalkoxy)ethyl N-phenylcarbamates have been discovered to possess properties which render them valuable agricultural chemicals, notably as herbicidal and growth regulatory materials. As such, they are valuable in combating weed growth.

Alpha-carbo(phenoxyalkoxy)ethyl N-phenylcarbamates may be considered as esters of a theoretical N-phenylcarbamic acid and a phenoxyalkoxy lactate, the carboxyl group of the carbamic acid being esterified with the alcoholic hydroxy group of the lactate. This alcoholic hydroxy group is linked to the alpha carbon atom of the acid residue of the lactate.

Alpha-carbo-(phenoxyethoxy)ethyl N-phenylcarbamates may be represented by the following structural formula:

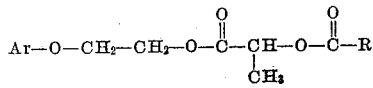

wherein Ar is a phenyl group and R is the residue of a phenylamine in which the amino nitrogen is linked directly to both the adjacent carboxylic carbon atom and to the phenyl nucleus. Substituted and unsubstituted phenyl nuclei depicted by Ar and R are included. That is, these phenyl radicals may contain from 1 to 5 ring substituents including halogens, notably chlorine, lower alkyl, lower alkoxy and lower alkenyl groups containing from 1 to 4 carbon atoms, —NO₂ groups, cyano groups and combinations thereof.

Of these, carbamates having a polychloro substituted phenyl radical, Ar, such as 2,4-dichlorophenyl and 2,4,5-trichlorophenyl comprise a select group. It is also advantageous to include in the meta position of the phenyl nucleus of R a substituent such as chlorine or a methyl group. Carbamates in which both phenyl radicals are substituted, as per the foregoing, are particularly favorable. Thus, alpha-carbo(2,4-dichlorophenoxyethoxy)-ethyl N-3-chlorophenylcarbamates, alpha-carbo-(2,4,5-trichlorophenoxyethoxy)ethyl N-3-chlorophenylcarbamates and alpha-carbo-(2,4-dichlorophenoxyethoxy)ethyl N-3-methyl phenylcarbamates are the more desirable members of the class.

Preparation of these carbamates is possible by one of several methods. A phenylisocyanate may be reacted with the lactate ester of a phenoxyethanol, usually by gently heating or refluxing the reagent mixture for an extended time period, on the order of at least several hours and often substantially longer, such as one or two days. Desired reaction temperatures are at least 100° C. and more generally range from 105° to 120° C. or higher.

It is also possible to prepare these carbamates by reaction of a phenylamine, notably aniline or substituted anilines, with the chloroformate of a phenoxyethyl lactate, notably in the liquid phase. Reaction temperatures above the freezing point of the mixture and below 50° C., e. g. between 0° C. and 20° C. may be used. Also, the reaction medium should include a hydrogen chloride acceptor to chemically bind the evolved hydrogen chloride of the reaction. Inorganic and organic basic compounds serve in this capacity.

Typical inorganic basic materials include the oxides, hydroxides, carbonates, and bicarbonates of sodium, potassium, barium, strontium and magnesium or other alkaline earth metals or alkali metals. Organic bases such as pyridine, and quaternary ammonium bases such as trimethyl phenyl ammonium hydroxide are likewise suitable. Even the phenylamine reactant itself will serve as a hydrogen chloride acceptor by formation of its corresponding amine hydrochloride, but when so employed, stoichiometric excesses thereof, up to 100 percent or more, are requisite.

With the chloroformate procedure, it is sometimes advantageous to bring the two reactants into reacting contact by special procedures, although merely mixing the two under conditions conducive to carbamate formation will produce the desired compound. One particularly advantageous procedure includes slowly adding the chloroformate to a pool of the phenylamine and hydrogen chloride acceptor. Another simultaneously adds independent streams of the hydrogen chloride acceptor and chloroformate to a medium initially containing the phenylamine, and if desired, a suitable inert organic solvent. Reaction media which include inert organic solvents are readily agitated and processed. Thus, frequently inert organic solvents, that is materials which are unreactive under conditions conducive to carbamate formation, e. g. organic materials free from reactive OH and/or NH₂ groups are included. Typical solvents include benzene, the halogenated hydrocarbons such as the chlorinated hydrocarbons like carbon tetrachloride, ethylene dichloride, perchloroethylene and chloroform, and other well known inert organic solvents. Solvents having specific densities above 1.2 or below about 0.8 are most useful, permitting simple phase separation of the organic phase from the aqueous phase.

In either of the two above-described reactions, essentially stoichiometric proportions (equimolecular quantities) of reactants are suitable. By the chloroformate procedure, a slight stoichiometric excess of the chloroformate, such as about 10 to 30 percent excess of theoretical, is sometimes more efficient.

Lactates for reaction with phenyl isocyanate or for phosgenation to their corresponding chloroformate may be prepared by esterifying a phenoxy ethanol. Esterification is achieved by heating stoichiometric quantities of the lactic acid and phenoxyethanol for several hours. This heating is preferably sufficient to provide reflux and permit removal of the water of reaction. The incorporation of a suitable azeotropic entrainer such as benzene expedites water removal. In those instances where the esterification proceeds slowly, the incorporation of a small quantity of strong inorganic acid such as sulfuric acid and/or the use of stoichiometric excess of the alcohol are recommended. Of course, other methods for preparing the lactate are likewise suitable.

The following example illustrates the manner in which a phenoxyethyl lactate may be prepared, although the invention is not intended to be so limited.

Example 1

In a 2-liter, round-bottom, 1-necked flask, equipped with a Dean-Starke-type trap and refluxing condenser is mixed 310.7 grams (1.5 moles) of 2,4-dichlorophenoxyethanol, 318.0 grams of lactic acid containing 85 percent by weight of lactic acid (equivalent to 3.0 moles of anhydrous lactic acid—Mallinckrodt, U. S. P. grade) and 600 milliliters of benzene. This mixture is then raised to refluxing temperature and refluxed for 28½ hours while continually removing water. Midway through this time period, 5 to 10 grams of concentrated sulfuric acid is added.

The resulting reaction medium is diluted with 700 milliliters of benzene and subsequently washed successively with two 800 milliliter portions of distilled water, two 500 milliliter portions of aqueous sodium bicarbonate containing 5 percent sodium bicarbonate by weight and three 800 milliliter portions of water. Further washings with two 500 milliliter portions of aqueous sodium bicarbonate solution containing 5 percent sodium bicarbonate by weight and two 800 milliliter washings with distilled water renders the organic solution neutral. This neutral benzene solution is heated under reduced pressure to a maximum vapor temperature of 90° C. and maximum pot temperature of 180° to 185° C. to remove the benzene and moisture. Some 396.0 grams of 2,4-dichlorophenoxyethyl lactate having a refractive index of 1.5349 results. By analysis, this material has a saponification equivalent of 297 and contains 22.7 percent chlorine by weight.

It is to be appreciated that the above example and foregoing discussion of lactate preparation is applicable to the formation of other phenoxyethyl lactates. Thus, phenoxyethanol, 2,4,5-trichlorophenoxyethanol or similar phenoxyethanols may be used in lieu of the described 2,4-dichlorophenoxyethanols to provide their corresponding lactates.

The following examples illustrate the preparation of alpha-carbo(phenoxyethoxy)ethyl N-phenylcarbamates.

*Example II*

Equimolecular quantities of 2,4-dichlorophenoxyethoxy lactate and phenyl isocyanate are mixed in a one-necked round-bottomed flask. After observing the refractive index of the initial mixture, heating is instituted and maintained until the refractive index becomes constant at about 20 hours. Then, the mixture is cooled, dissolved in methylene chloride and washed with dilute hydrochloric acid (about 0.5 N hydrochloric acid), followed with several water washes. The methylene chloride is then removed by distilling off and topping for 2 hours at pot temperatures of from 100° C. to 130° C. at a maximum vacuum of from 2 to 5 millimeters' mercury pressure. A slight stream of nitrogen is also bubbled into the mixture during solvent removal to eliminate bumping. Product alpha-carbo-(2,4-dichlorophenoxyethoxy)-ethyl N-phenylcarbamate has a refractive index of 1.5660 and contains 16.9 percent chlorine, 10.6 percent $CO_2$ and 3.4 percent nitrogen, all by weight.

This product has a chemical structure represented by the following equation:

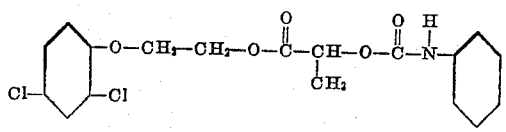

On a larger scale, the contemplated carbamate may be prepared as follows:

*Example III*

A reactor comprising a 5-gallon glass lined steel kettle filled with a steam-heated jacket is charged with 7.44 pounds of 2,4-dichlorophenoxyethyl lactate and 3.16 pounds of phenyl isocyanate. This mixture is heated with agitation to a temperature of 100° C. to 110° C. for some 36 hours. After partially cooling the batch, methylene chloride is added and the resulting mixture removed from the kettle. By washing with dilute hydrochloric acid (about 0.5 N hydrochloric acid) and five times with water followed by removing the methylene chloride, a high purity product is obtained. Solvent removal is achieved by topping in the 5-liter glass equipment at 15 to 20 millimeters of mercury absolute pressure and a pot temperature of 110° C.

Some 10.19 pounds of alpha-carbo-(2,4-dichlorophenoxyethoxy)ethyl N-phenylcarbamate is obtained. By analysis, this product contains 3.5 percent nitrogen and 10.6 percent $CO_2$ by weight.

*Example IV*

Over a period of 30 minutes, 92.1 grams (0.6 mole) of meta-chlorophenyl isocyanate is added to 167.5 grams (0.6 mole) of 2,4-dichlorophenoxyethyl lactate in a 500 milliliter, round-bottom, one-necked flask equipped with thermometer, adaptors, drying tube filled with a commercial drying agent "Drierite" and separatory funnel. Heating is then applied to maintain the mixture at between 110° C. and 117° C. for 5 hours. The index of refraction of the mixture rises from 1.5452 to 1.5701.

After diluting with some 200 milliliters of benzene, the mixture is washed with three 200 milliliter portions of 1 N hydrochloric acid, a 200 milliliter portion of water containing about 2 milliliters of aqueous sodium hydroxide containing 25 percent by weight sodium hydroxide, finally with four portions of distilled water. The thusly washed benzene layer is dried over anhydrous sodium sulfate, and the sodium sulfate is removed by suction filtration. After the filtrate is concentrated to about one-half its original volume, the residue is gravity filtered. Its filtrate is collected in a distilling flask and topped to remove benzene at a maximum pot temperature of 120° C. and 36 millimeters of mercury pressure. This product weighs 256.5 grams, has a refractive index of 1.5671 and by analysis contains 3.0 percent nitrogen, 9.4 percent $CO_2$ and 22.6 percent chlorine by weight. On standing for several weeks, slow solidification of the product is observed. This product has the following formula:

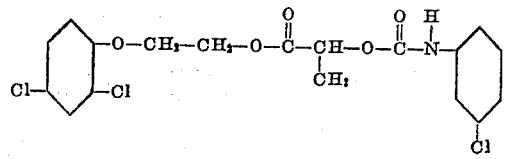

*Example V*

Some 101.1 grams (0.7593 mole) of meta-tolyl isocyanate is added dropwise over a twenty minute period to 211.9 grams of 2,4-dichlorophenoxyethyl lactate present in a 500 milliliter round bottom flask equipped as in Example IV. This mixture is heated to 108–120° C. for 5½ hours, and 115–137° C. for 16 more hours. After cooling to room temperature, diluting with 250 milliliters of benzene and gently agitating, precipitation of products begins. This precipitate is separated by filtration and combined with precipitate obtained by partial evaporation of benzene. A total of 141.5 grams of product, melting point 95–96° C. is obtained containing 3.5 percent nitrogen, 10.6 percent $CO_2$ and 15.6 percent chlorine by weight.

This product, alpha-carbo-(2,4-dichlorophenoxyethoxy)ethyl N-3-methylphenylcarbamate is depicted by this formula:

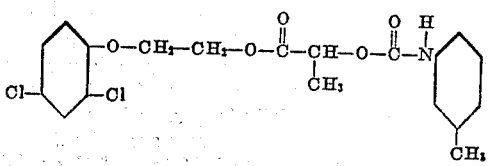

Further product is obtained by treating the mother liquor filtrate after separating the product precipitate.

Example VI

With the procedures of the foregoing examples, the following compounds are prepared:

| Isocyanate | Lactate Ester | Product |
|---|---|---|
| phenyl | 2,4,5-trichlorophenoxyethyl | alpha-carbo(2,4,5-trichlorophenoxyethoxy) N-phenylcarbamate. |
| meta-methylphenyl | phenoxyethyl | alpha-carbo(phenoxyethoxy) ethyl N-3-methylphenyl carbamate. |
| meta-nitrophenyl | 2,4-dimethoxyphenoxyethyl | alpha-carbo(2,4-dimethoxyphenoxyethoxy)ethyl N-3-nitrophenylcarbamate |

Other carbamates coming within the defined class include alpha - carbo(2,4,5 - trichlorophenoxyethoxy)ethyl N-2,5-dichlorophenylcarbamate, alpha-carbo-(2-chloro-4-methoxyphenoxyethoxy)ethyl N-3-ethylphenyl carbamate, alpha-carbo-(phenoxyethoxy)ethyl N-2-methyl-5-chlorophenylcarbamate and alpha - carbo - (phenoxyethoxy)ethyl N-3-cyanophenylcarbamate among others.

These carbamates are either liquid at room temperature or are low melting solids. Some of these contemplated alpha-carbo(phenoxyethoxy)ethyl N-phenylcarbamates appear to supercool quite readily and thus misleadingly seem to be liquids at room temperatures. However, upon standing, even sometimes for lengthy periods, many finally crystallize.

Alpha - carbo - (phenoxyethoxy)ethyl N - phenylcarbamates are particularly useful as herbicides, especially for killing or combating weeds. When compounds of this group as subjected to standard cucumber germination tests and compared with the sodium salt of 2,4-dichlorophenoxyacetic acid, a compound of known herbicidal activity, they demonstrate acceptably high activity.

Solutions containing 10 parts per million and 100 parts per million of the specified alpha-carbo(phenoxyethoxy)ethyl N-phenylcarbamates were prepared and five milliliters of each said solution were added to cucumber seeds placed on a piece of filter cloth and in four inch Petri dishes whereafter the Petri dishes were covered. Germination was allowed to occur in the dark for 90 hours at 30° C. The length of the primary root was measured after 90 hours and the relative herbicidal activity determined in comparison with the activity of the sodium salt of 2,4-dichlorophenoxy acetic acid applied in the same strength and manner as the carbamate. Distilled water was used as a control. The following table lists the results:

|  | Relative Herbicidal Activity—Percent | |
|---|---|---|
|  | 10 parts per million | 100 parts per million |
| Sodium salt of 2,4-dichlorophenoxy-acetic acid | 100 | 100 |
| Alpha-carbo(2,4-dichlorophenoxyethoxy)ethyl N-phenylcarbamate | 90 | 90 |
| Alpha-carbo(2,4-dichlorophenoxyethoxy)ethyl N-3-chlorophenylcarbamate | 90 | 92 |
| Alpha-carbo(2,4-dichlorophenoxyethoxy)ethyl N-3-methylphenylcarbamate | 90 | 90 |
| Control—(Distilled water) | 0 | 0 |

The relative herbicidal activity of the alpha-carbo-(2,4-dichlorophenoxyethoxy)ethyl N-phenylcarbamates in the above table is calculated based upon the control (distilled water) representing the maximum degree of germination and the degree of germination found with the sodium salts of 2,4-dichlorophenoxyacetic acid, the latter arbitrarily assigned as 100 percent growth inhibition. Thus, these carbamates have herbicidal activity of a high magnitude.

Carbamates of this class, besides having general herbicidal activity and thus being generally effective in combatting weeds, exhibit selective herbicidal activity in their herbicidal action. For example, these carbamates, when applied in usual field dosages of from 2 to 10 pounds per acre, and preferably 4 pounds per acre, have little or no effect on bean growths, e. g. green beans, soya beans, Lima beans, and other crops such as corn and buckwheat but on the other hand, are quite herbicidally active against crab grass, barn yard grass, pig weed, purslane, cucumbers, barley, onions, carrots, lettuce, muskmelon, peppermint, sweet potatoes, and tomato growths. Compounds herein contemplated are useful for combating weeds in corn, spinach, beets, and bean fields.

When used as a weed combatant, the contemplated carbamates are formulated into suitable liquid or solid compositions. Usually, liquid formulations approximately of 2 to 8 pounds or more preferably in the range of 3 to 5 pounds of carbamate per gallon are initially prepared. This enables the farmer to suitably dilute a single gallon with water and spray apply the resulting aqueous dispersion or solution over a single acre.

Liquid organic formulations which may thereafter be diluted with water are prepared by dissolving the carbamate with a suitable hydrocarbon solvent such as xylene, toluene, gasoline, and kerosene or other hydrocarbons and more preferably the above aralkyl hydrocarbons and also the alkylated naphthalenes and commercial mixtures thereof. The initial formulation may also be achieved by using solvents such as ethyl alcohol, methyl alcohol, isopropyl alcohol, butyl alcohol, ethyl ether, acetone, and like recognized oxygen-containing organic inert solvents. The concentration of carbamate in this liquid formulation ranges from 2 to 8 pounds per gallon.

A surface active or wetting agent may be added to the solvent and carbamate, thereby providing an emulsifiable system. Surface active agents such as sodium alkylaryls sulfonates, sulfonated dicarboxylic acid esters such as dialkyl sodium sulfosuccinate, alkyl naphthalene sulfonic acids, etc. are appropriate. This emulsifiable system is mixed with water to form aqueous dispersions containing 0.1 to 5.0 percent by weight of the carbamate. Such aqueous dispersion is applied to plant growth for combatting weeds as a spray, usually by use of specialized low-gallon sprayers or conventional sprayers. Wetting agent concentrations between 10 to 30 percent by weight of the solvent and carbamate, depending upon the amount necessary for dispersion are normal. If an aqueous solution is desired, an organic solvent is selected which is water soluble and in which the carbamate will also remain in the solution, even upon dilution with water. Water soluble solvents such as the hereinbefore described lower aliphatic alcohols, acetones, ethylene glycol, and the like may serve this purpose.

It is frequently advantageous in the formulation of organic liquid compositions to include both a hydrocarbon solvent and more notably an aralkyl solvent such as xylene, or alkylated naphthalenes, and an inert organic oxygen-containing solvent such as isopropanol or other aliphatic monohydric alcohols. The hydrocarbon solvent should constitute the major portion by weight of the solvents. Preferably, the concentration of hydrocarbon solvents should range from about 55 percent to 95 or 97 percent, based on total organic solvents, with the balance an organic oxygen-containing solvent.

Example of an acceptable formulation is as follows:

|  | Weight percent of total composition |
|---|---|
| Alpha - carbo - (2,4-dichlorophenoxyethoxy)ethyl N-phenylcarbamate | 46.3 |
| Xylene | 40.2 |
| Isopropanol | 1.9 |
| Atlox 2083* | 11.6 |

*Atlox 2083 is a commercial wetting agent sold by Atlas Product Company which is sulfonated oil plus mixed polyoxylene sorbitol esters of mixed fatty and resin acids.

The present application is a continuation-in-part of my prior application Serial No. 419,570, filed March 29, 1954.

Although the present invention has been described with reference to specific details of certain embodiments, it is not intended that the invention be construed as limited thereto except insofar as the appended claims are concerned.

I claim:

1. A compound of the formula:

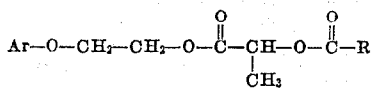

wherein Ar is a phenyl radical and R is the residue of a phenyl amine in which the amino nitrogen is linked directly to both the adjacent carboxylic carbon atom and to the phenyl nucleus.

2. A compound of the formula:

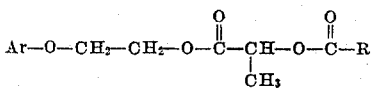

wherein Ar is a phenyl radical containing at least two chlorine ring substituents and R is the residue of a phenyl amine in which the amino nitrogen is linked directly to both the adjacent carboxylic carbon atom and to the phenyl nucleus.

3. A compound of the formula:

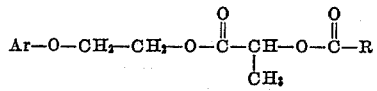

wherein Ar is a phenyl radical containing at least two chlorine ring substituents and R is the residue of a phenyl amine in which a phenyl amine is linked directly to both the adjacent carboxylic carbon atom and to the phenyl nucleus and the phenyl nucleus contains at least one chlorine ring substituent.

4. An alpha-carbo(chlorophenoxyethoxy)ethyl N-phenylcarbamate.

5. Alpha-carbo(2,4-dichlorophenoxyethoxy)-ethyl N-phenylcarbamate.

6. Alpha-carbo-(2,4-dichlorophenoxyethoxy)-ethyl N-3-chlorophenylcarbamate.

7. Alpha-carbo-(2,4-dichlorophenoxyethoxy)-ethyl N-3-methylphenylcarbamate.

References Cited in the file of this patent

Beilstein, 12, 340 (1929).
Mitchell et al.: Science, 120, 263–5 (1954).